(12) United States Patent
Iorga et al.

(10) Patent No.: US 11,964,551 B2
(45) Date of Patent: Apr. 23, 2024

(54) ACTIVE GRILLE SHUTTER VANE FOR A VEHICLE

(71) Applicant: JAGUAR LAND ROVER LIMITED, Coventry (GB)

(72) Inventors: George Tudor Iorga, Leamington Spa (GB); Goncalo Pereira, Coventry (GB); Jehan Eliyas, Coventry (GB); Arun Jose, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 516 days.

(21) Appl. No.: 17/275,186

(22) PCT Filed: Sep. 9, 2019

(86) PCT No.: PCT/EP2019/073989
§ 371 (c)(1),
(2) Date: Mar. 10, 2021

(87) PCT Pub. No.: WO2020/053146
PCT Pub. Date: Mar. 19, 2020

(65) Prior Publication Data
US 2021/0323397 A1    Oct. 21, 2021

(30) Foreign Application Priority Data

Sep. 10, 2018  (GB) ...................... 1814669

(51) Int. Cl.
*B60K 11/08*     (2006.01)
*B60R 19/52*     (2006.01)
(Continued)

(52) U.S. Cl.
CPC ............ *B60K 11/085* (2013.01); *B60R 19/52* (2013.01); *F01P 7/10* (2013.01); *F01P 11/10* (2013.01); *B60R 2019/527* (2013.01)

(58) Field of Classification Search
CPC . B60K 11/085; B60R 19/52; B60R 2019/527; F01D 7/10; F01D 11/10
(Continued)

(56) References Cited

U.S. PATENT DOCUMENTS 3,954,230 A * 5/1976 Machuta ................. F02K 1/002
                                                 416/240
4,235,397 A * 11/1980 Compton .................. B64C 3/48
                                                 416/240
(Continued)

FOREIGN PATENT DOCUMENTS

CN     101716920 A     6/2010
DE     102013019252 A1  5/2015
(Continued)

OTHER PUBLICATIONS

Combined Search and Examination Report corresponding to Great Britain Application No. GB1814669.6, dated Sep. 19, 2019, 8 pages.

(Continued)

*Primary Examiner* — Justin M Jonaitis
(74) *Attorney, Agent, or Firm* — Reising Ethington P.C.

(57) ABSTRACT

Aspects of the present invention relate to an active grille shutter vane for an active grille shutter assembly. The vane comprises: a leading edge and a trailing edge whereby, in use, the vane is configured such that airflow passes around the vane from the leading edge to the trailing edge when the active grille shutter assembly is in an open configuration; and a primary surface extending between the leading edge and the trailing edge. The leading edge, primary surface and trailing edge provide a continuous cambered attachment surface for the airflow passing over the primary surface to encourage attachment of the airflow to the vane.

15 Claims, 11 Drawing Sheets

(51) Int. Cl.
*F01P 7/10* (2006.01)
*F01P 11/10* (2006.01)

(58) Field of Classification Search
USPC .......................................................... 165/98
See application file for complete search history.

(56) References Cited

U.S. PATENT DOCUMENTS

| | | | | |
|---|---|---|---|---|
| 8,646,552 | B2* | 2/2014 | Evans | B60R 19/12 |
| | | | | 180/68.1 |
| 9,994,100 | B1* | 6/2018 | Del Gaizo | B60K 11/04 |
| 10,363,811 | B2* | 7/2019 | Klop | B60H 1/242 |
| 10,449,850 | B2* | 10/2019 | Gillard | B60K 11/085 |
| 10,525,819 | B2* | 1/2020 | Lindberg | F24F 13/15 |
| 2003/0029581 | A1* | 2/2003 | Vide | B60K 11/085 |
| | | | | 160/201 |
| 2003/0047365 | A1* | 3/2003 | Jain | B60K 11/08 |
| | | | | 180/68.1 |
| 2013/0223980 | A1* | 8/2013 | Pastrick | B60K 11/085 |
| | | | | 415/1 |
| 2017/0106741 | A1 | 4/2017 | Shaw et al. | |

FOREIGN PATENT DOCUMENTS

| | | | |
|---|---|---|---|
| FR | 1045729 A | 12/1953 | |
| WO | 2013092141 A1 | 6/2013 | |
| WO | 2015142582 A1 | 9/2015 | |
| WO | WO-2015142582 A1 * | 9/2015 | ........... B60K 11/085 |
| WO | WO-2016062382 A1 * | 4/2016 | ........... B60K 11/085 |
| WO | 2018029655 A1 | 2/2018 | |
| WO | 2018150110 A1 | 8/2018 | |

OTHER PUBLICATIONS

International Search Report corresponding to International Application No. PCT/EP2019/073989, dated Jan. 3, 2020, 4 pages.
Written Opinion corresponding to International Application No. PCT/EP2019/073989, dated Jan. 3, 2020, 8 pages.

* cited by examiner

ACTIVE GRILLE SHUTTER VANE FOR A VEHICLE

TECHNICAL FIELD

The present disclosure relates to an active grille shutter vane for use with automotive cooling packs. Aspects of the invention relate to an active grille assembly, to a cooling pack, and to a vehicle.

BACKGROUND

Automotive cooling packs keep the powertrain and vehicle cabin within a working temperature range. Cooling packs for vehicles having an internal combustion engine comprise a radiator to reject waste heat from the engine and, commonly, an air conditioning (AC) system to cool the cabin. The radiator and a heat exchanger of the AC system both require a flow of air through them in order to operate efficiently. This comes with an associated aerodynamic drag penalty on the vehicle which increases the power required to maintain a steady speed, resulting in increased fuel consumption and emissions.

It is known to provide an active grille assembly for automotive applications that comprise shutter vanes configured to selectively block off or open up an air intake 211 to a cooling pack depending on the cooling pack requirements. For example, when the cooling pack requirements are above a threshold, the vanes are moved into an open position to minimise blockage of the air intake and maximise the mass flow of air that can pass through. Below this threshold the vanes close, directing airflow over the vehicle's exterior surfaces. This reduces aerodynamic drag as the vehicle's exterior surfaces present fewer obstructions to airflow than the cooling pack.

A problem associated with present active grille assemblies is that they are not configured to optimise mass flow through the cooling pack during low to intermediate engine load conditions.

It is an aim of the present invention to address one or more of the disadvantages associated with the prior art.

SUMMARY OF THE INVENTION

Aspects and embodiments of the invention provide an active grille shutter vane for an active grille shutter assembly, an active grill shutter assembly, and a vehicle as claimed in the appended claims.

According to an aspect of the present invention there is provided an active grille shutter vane for an active grille shutter assembly, the vane comprising:
a leading edge and a trailing edge whereby, in use, the vane is configured such that airflow passes around the vane from the leading edge to the trailing edge when the active grille shutter assembly is in an open configuration; and
a primary surface extending between the leading edge and the trailing edge;
wherein the leading edge, primary surface and trailing edge provide a continuous cambered attachment surface for the airflow passing over the primary surface to encourage attachment of the airflow to the vane.

Therefore the vane can be configured to adopt an intermediate opening position between fully open and fully closed, without inducing airflow separation. The intermediate position directs more airflow over/around the vehicle compared to a vane in a fully open position, while still permitting sufficient air into the cooling pack.

The vane may comprise a chord to maximum thickness ratio of between 5% and 15%, or between 5% and 10%.

A chord to maximum thickness ratio of between 5% and 15% defines an aerofoil profile for the vane which offers good flow attachment characteristics at the operating angles of attack of the vane and the airspeeds likely to be seen in operation of the active grille shutter assembly.

In an embodiment, the chord to maximum thickness ratio may be approximately 8%.

In an embodiment, the chord to maximum thickness ratio may be 7.8%.

The vane may comprise a maximum thickness at between 15% and 25% of the chord from the leading edge.

A maximum thickness between 15% and 25% defines a profile of the vane that is optimised to reduce the obstruction the vane makes when in an open position in the shutter grille assembly, allowing an optimum mass flow of air into a vehicle cooling pack.

In an embodiment, the maximum thickness may be at approximately 20% of the chord from the leading edge.

In an embodiment, the maximum thickness may be at 19.9% of the chord from the leading edge.

A centre line of the vane may have a maximum camber of between 5% and 8%.

A centre line of the vane having a maximum camber of between 5% and 8% defines an aerofoil profile for the vane which offers good flow attachment characteristics at the operating angles of attack of the vane and the airspeeds likely to be seen in operation of the active grille shutter assembly.

In an embodiment, the centre line of the vane may have a maximum camber of 6.5%.

The centre line of the vane may have a maximum camber at between 35% and 45% of the chord from the leading edge.

The location of maximum camber being between 35% and 45% of the chord from the leading edge defines an aerofoil profile for the vane which offers good flow attachment characteristics at the operating angles of attack of the vane and the airspeeds likely to be seen in operation of the active grille shutter assembly. Furthermore, the location of maximum camber being between 35% and 45% of the chord from the leading edge reduces the obstruction the vane makes when in an open position in the shutter grille assembly, allowing the optimum mass flow of air into a vehicle cooling pack.

In an embodiment, the centre line of the vane may have a maximum camber at approximately 40% of the chord from the leading edge.

In an embodiment, the centre line of the vane may have a maximum camber at 39.9% of the chord from the leading edge.

The vane may comprise a filleted leading edge.

Therefore, separation is less likely to be induced by the leading edge of the vane.

The vane may comprise a secondary surface extending between the leading edge and the trailing edge, the secondary surface opposing the primary surface and comprising at least one vortex generating feature configured to generate a vortex in the airflow over the secondary surface.

The vortex generated by the vortex generating feature promotes airflow attachment over the primary surface of an adjacent vane in the active grille assembly.

The at least one vortex generating feature may comprise at least one fin.

Therefore, the vortex generating feature is small and easy to package.

The at least one vortex generating feature may comprise a structural web including a rib.

Therefore, the vortex generating feature forms part of a stiffening structure of the vane, which further reduces weight.

The trailing edge of the vane may be configured to cooperate with the leading edge of an adjacent vane when said vanes are in a closed configuration.

Therefore, the vanes cooperate to direct airflow over the active grille assembly.

The trailing edge may be configured to contact the cambered surface of the adjacent vane in the closed configuration.

Therefore, the vanes are designed to cooperate using existing features.

According to another aspect of the invention, there is provided an active grille shutter assembly for controlling airflow into an air inlet, the active grille shutter assembly comprising at least one active grille shutter vane according to any of claims 1 to 18.

The at least one active grille shutter vane may be moveable between a closed configuration in which the at least one vane is configured to inhibit airflow into the air inlet, and an open configuration in which the at least one vane is configured to permit airflow into the air inlet.

Therefore, the active grille assembly is configured to reduce the aerodynamic load on a vehicle in which it is installed, when in the closed position, by directing air over the vehicle rather than through a cooling pack.

The open configuration may comprise an open position, in which the at least one vane is configured to permit a first airflow into the air inlet and an intermediate position, in which the at least one vane is configured to permit a second, reduced, airflow into the air inlet;

the active grille shutter assembly further comprising a controller configured to position the at least one active grille shutter vane in the intermediate position.

Therefore, the active grille shutter assembly is configured to optimise the airflow through the air inlet so that only the airflow required for cooling passes through a cooling pack. In the intermediate position, more air is directed over the vehicle in which the active grille assembly is installed, than if the vane were in the open position, reducing drag.

According to yet another aspect of the invention, there is provided a vehicle comprising at least one active grille shutter assembly of any one of claims 19 to 21.

The vehicle may further comprise a first active grille shutter assembly and at least one further active grille shutter assembly, wherein:

the primary surface of the at least one active grille shutter vane of the first active grille shutter assembly comprises an upper surface of the at least one active grille shutter vane when in the open configuration; and the primary surface of the at least one active grille shutter vane of the at least one further active grille shutter assembly comprises a lower surface of the at least one active grille shutter vane when in the open configuration.

Therefore, the first active grille assembly and at least one further active grille assembly are locatable either side of a bumper bar of a vehicle for optimal packaging of the assemblies.

The first active grille shutter assembly may be located above the at least one further active grille shutter assembly.

BRIEF DESCRIPTION OF THE DRAWINGS

One or more embodiments of the invention will now be described, by way of example only, with reference to the accompanying drawings, in which.

DETAILED DESCRIPTION

Figure 1A:
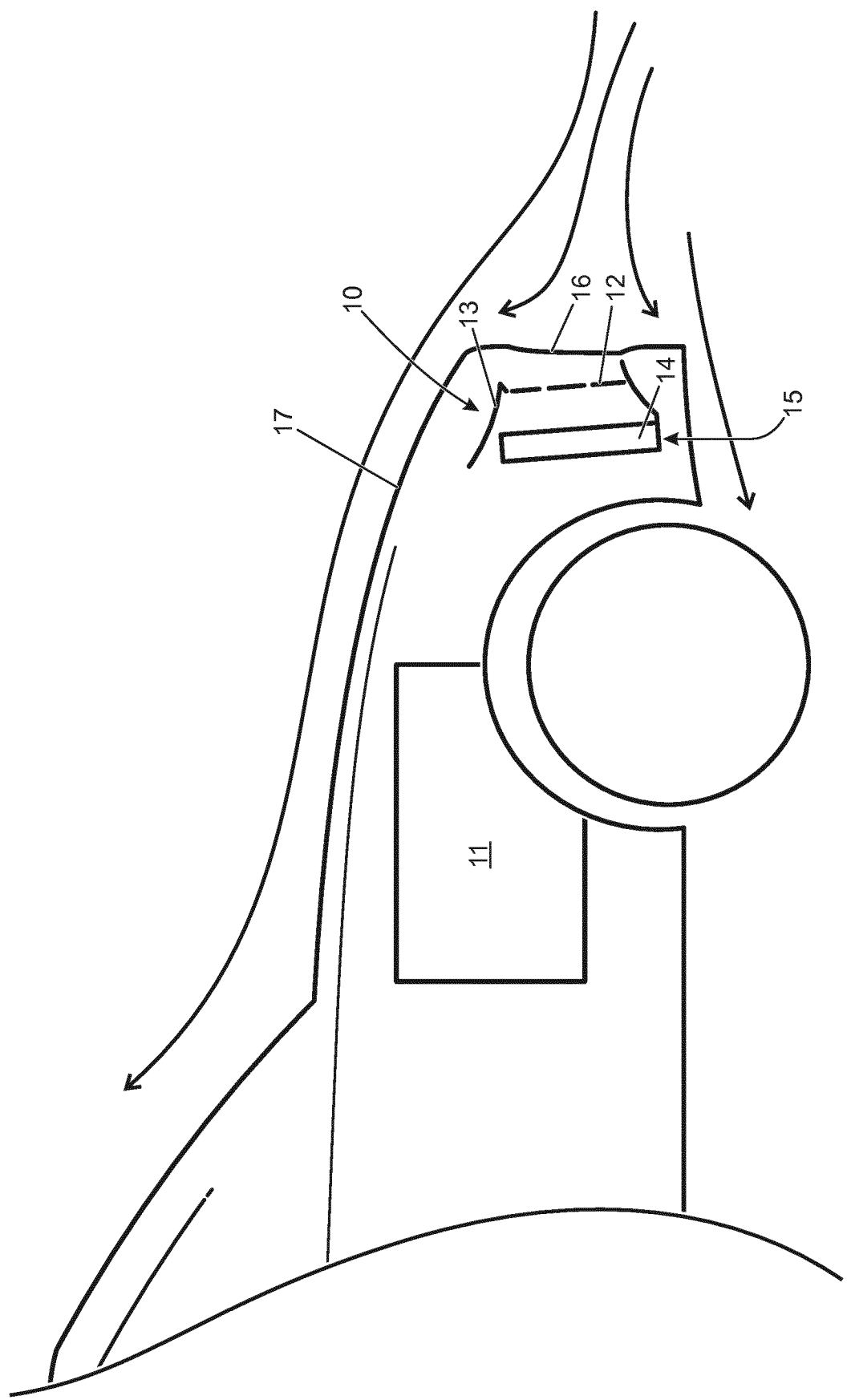
FIG. 1a shows a schematic representation of a vehicle comprising an example active grille assembly in a closed position.
Figure 1B:
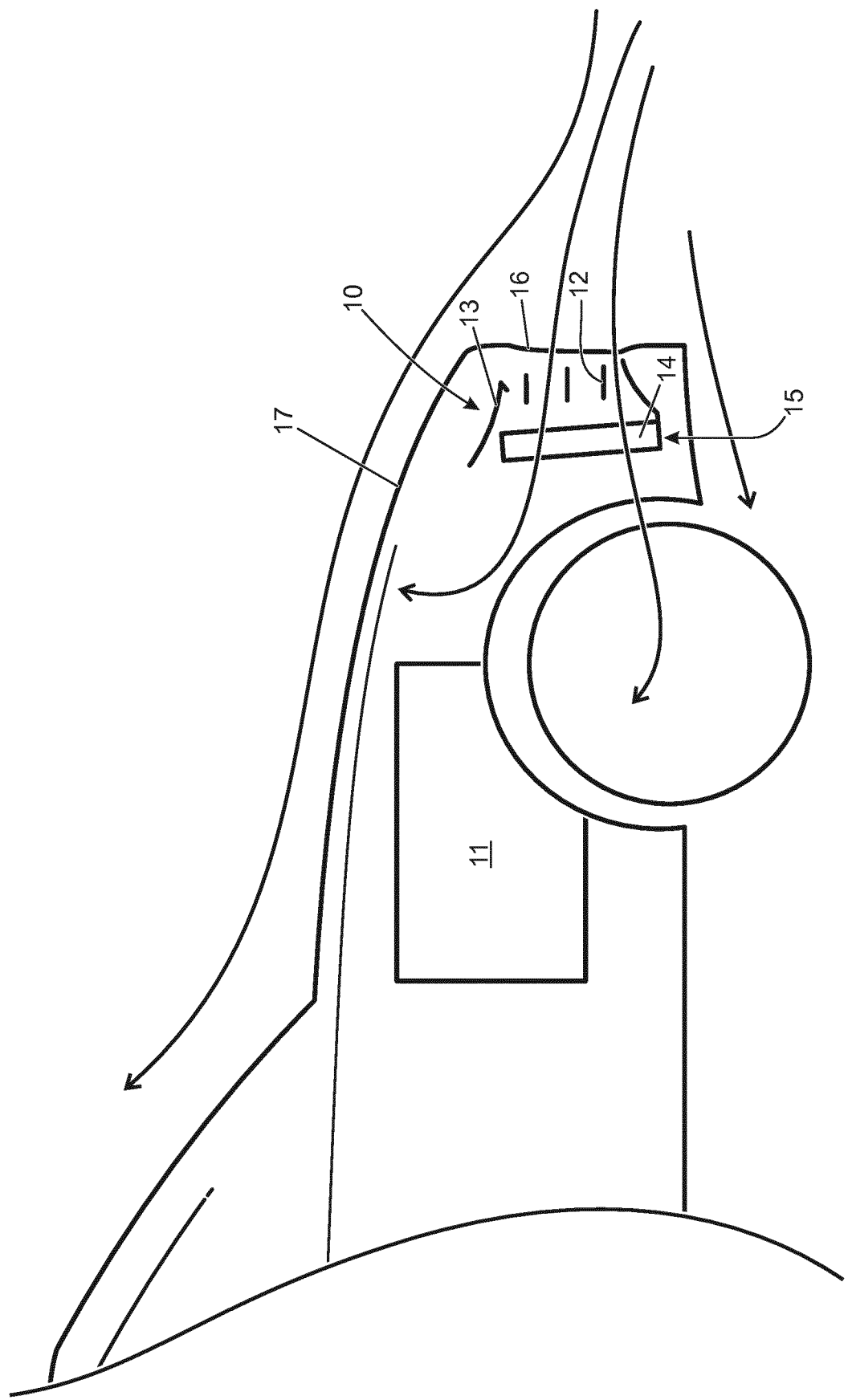
FIG. 1b shows a schematic representation of a vehicle comprising the example active grille assembly of FIG. 1a, in an open position.

FIG. 1a shows a schematic of a vehicle comprising an example active grille assembly 10 and an internal combustion engine 11. The example active grille assembly 10 is shown in a closed position. FIG. 1b shows the same active grille assembly 10 in an open position.

The active grille comprises a series of shutters 12 and a surround 13 that together form an intake that communicates with a radiator 14 of a cooling pack 15. During operation of the vehicle, airflow passes through a grille 16 in exterior bodywork 17 of the vehicle and toward the intake. When the shutters 13 are arranged in the closed position, airflow is prevented from passing through the radiator 14 and instead is directed over the exterior bodywork 17. As the exterior bodywork 17 presents less of an obstruction to the airflow than the radiator 14, drag is reduced.

When the vehicle's engine temperature increases outside of an acceptable working range, the shutters 12 are moved into the open position to allow airflow to pass through the radiator 14, increasing the amount of heat that the radiator 14 can reject. This process maintains the engine temperature within the acceptable working range and prevents damage to the engine 11.

A problem associated with such example active grille assemblies 10 is that for a significant proportion of low to intermediate cooling requirements, more airflow than is necessary is directing through the cooling pack. Adjusting the shutters 12 to an intermediate position between the open and closed positions is inefficient, as will be explained further below.

Figure 2A:
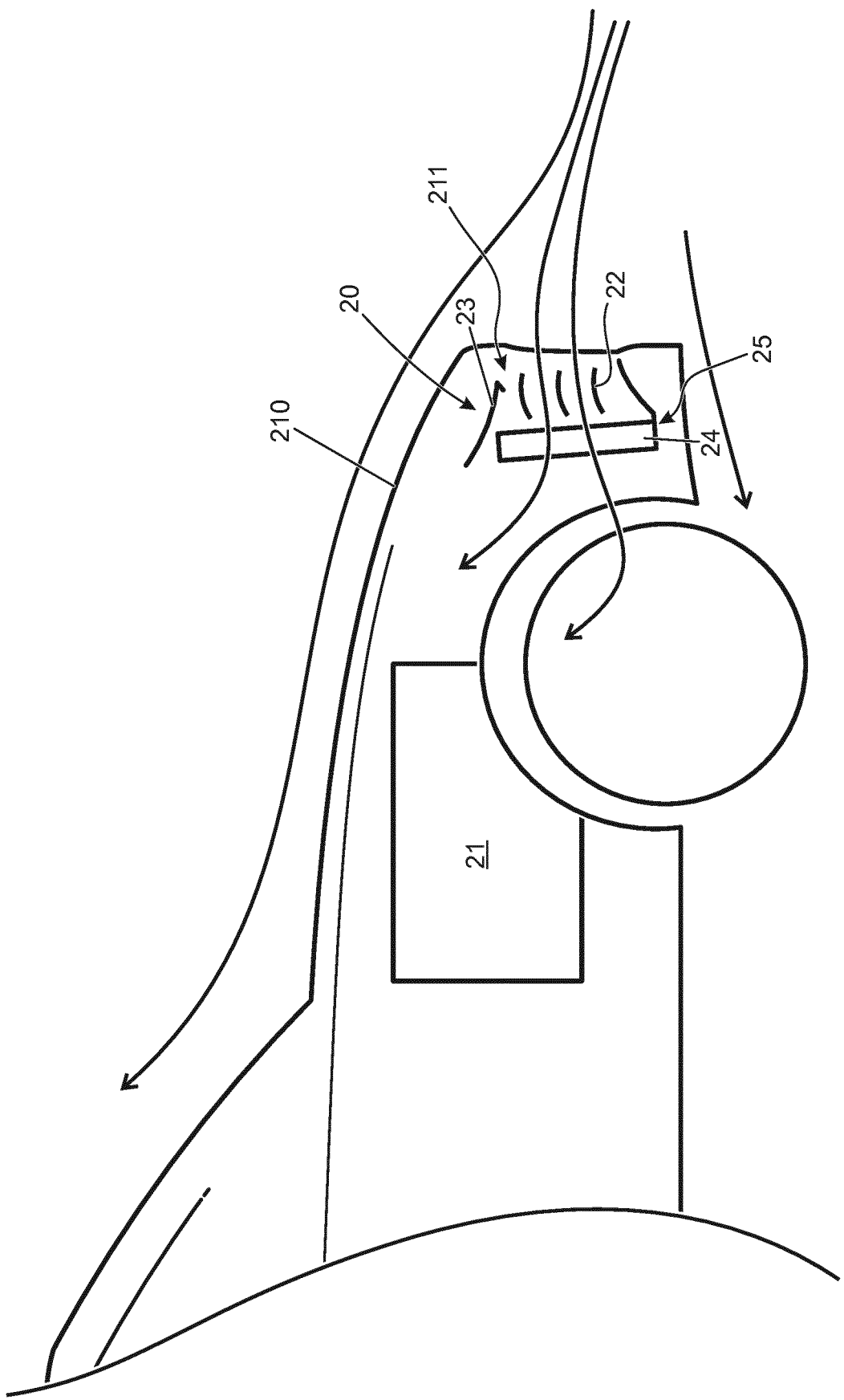
FIG. 2a shows a schematic representation of a vehicle comprising an active grille assembly in an open position, according to an embodiment of the invention.
Figure 2B:
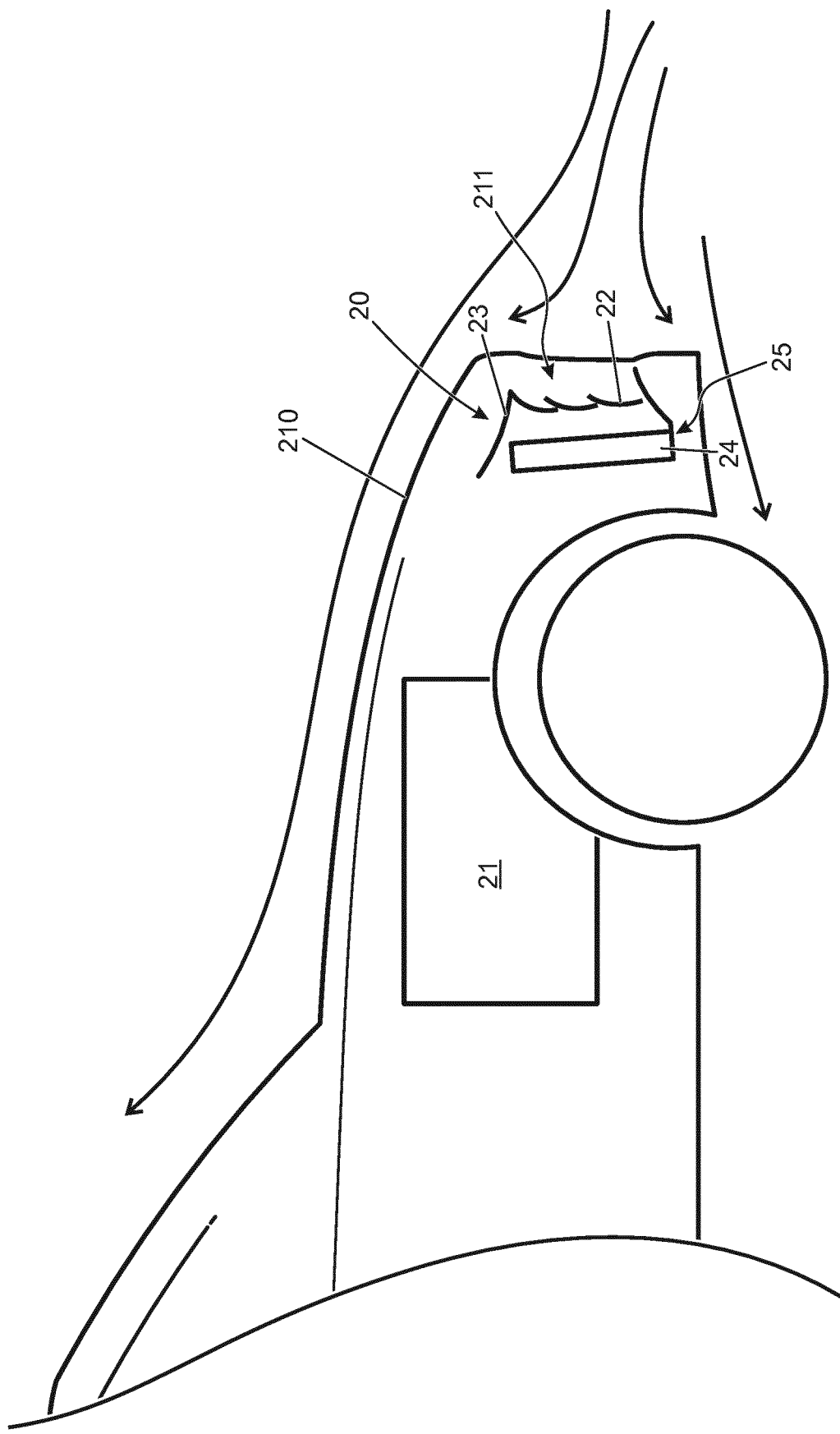
FIG. 2b shows a schematic representation of a vehicle comprising the active grille assembly of FIG. 2a, in a closed position.
Figure 2C:
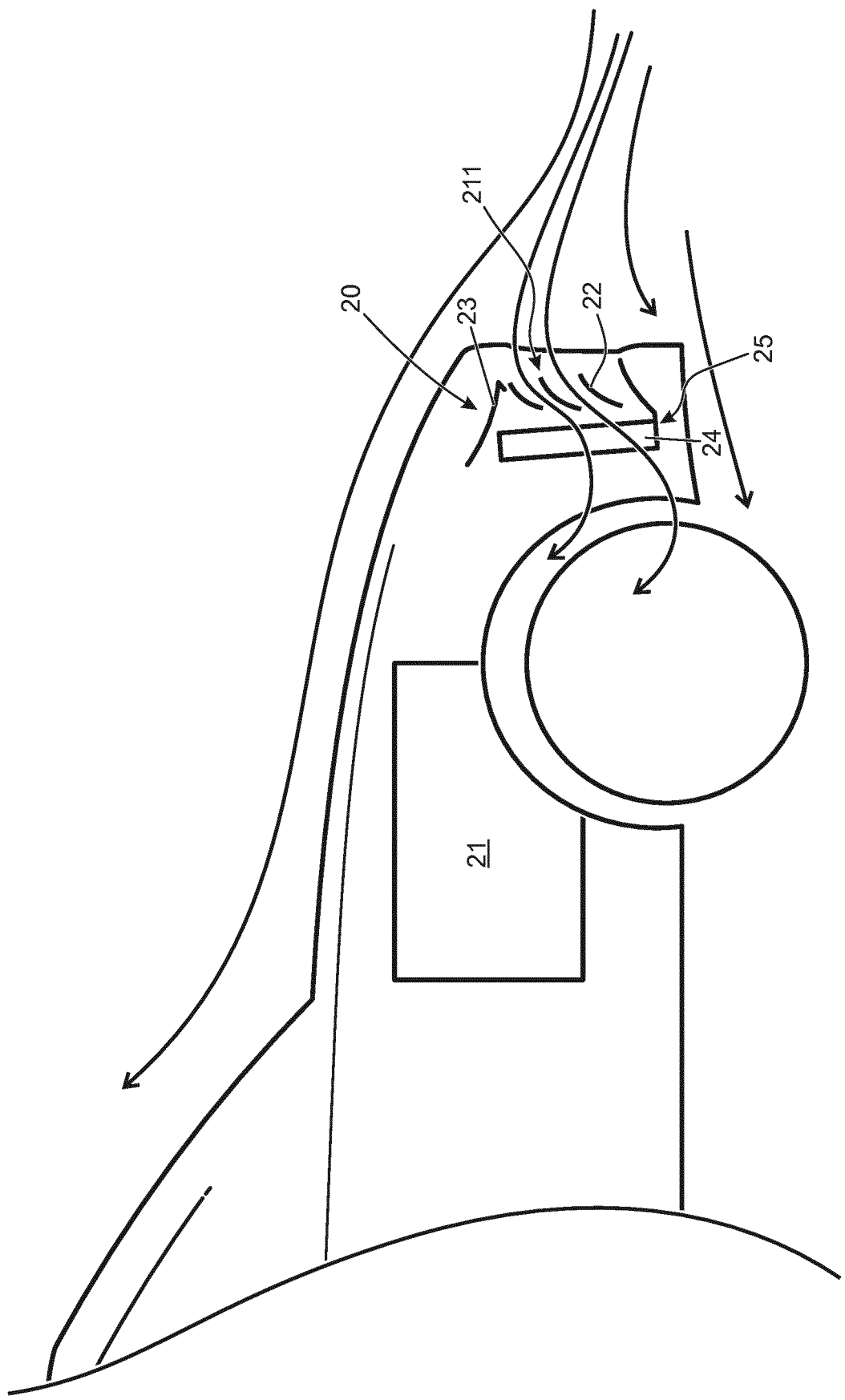
FIG. 2c shows a schematic representation of a vehicle comprising the active grille assembly of FIGS. 2a and 2b, in an intermediate position.

In accordance with embodiments of the invention, a vehicle comprising an active grille shutter assembly 20 and an internal combustion engine 21 is shown in FIGS. 2a to 2c. The active grille 20 comprises a series of shutters 22, herein referred to as vanes 22, and a surround 23 that together form an intake 211 that communicates with a radiator 24 of a cooling pack 25. Each vane 22 has an axis of rotation about which it can be rotated between an open position, as shown in FIG. 2a, a closed position, as shown in FIG. 2b, and an intermediate position between the open and closed positions, as shown in FIG. 2c. In the illustrated embodiments, the axis of rotation extends into the page.

The vanes 22 are arranged so that their respective axes of rotation are parallel and in planar alignment. Therefore, with the vanes 22 in the closed position, the vanes 22 cooperate to present a continuous surface, blocking the intake 211 and preventing airflow from passing through the cooling pack 25. Airflow is instead directed over exterior bodywork 210. As the exterior bodywork 210 presents less of an obstruction to the airflow than the cooling pack 25, aerodynamic drag on the vehicle is reduced.

Figure 3C:
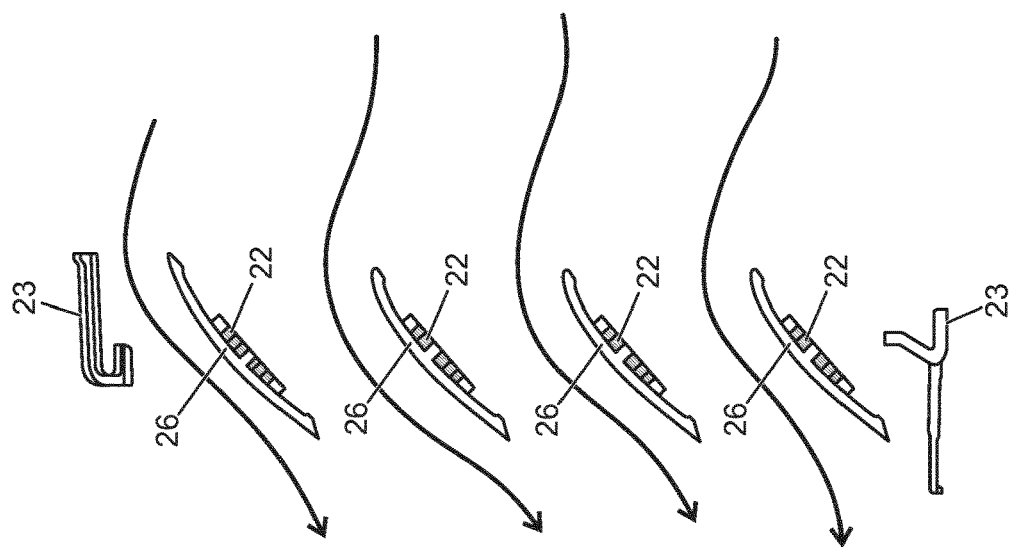
FIG. 3c shows a detailed schematic representation of the active grille assembly of FIGS. 2a to 2c, in the intermediate position.
Figure 3B:
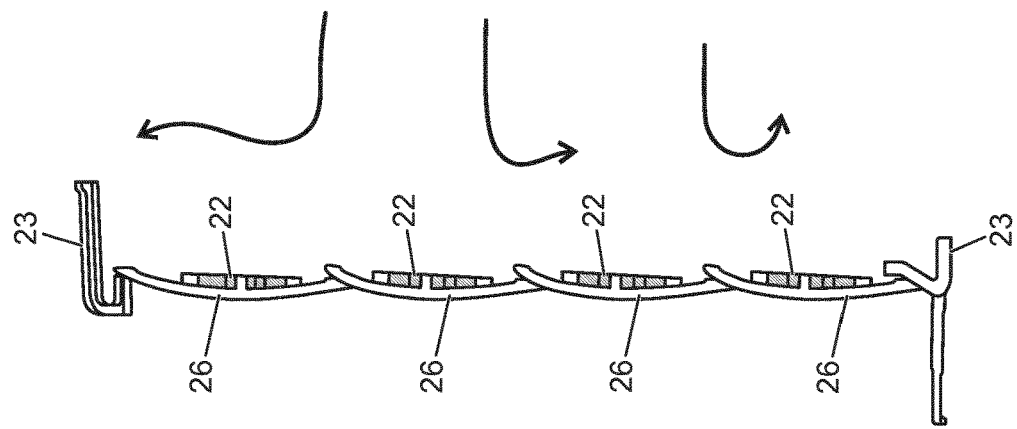
FIG. 3b shows a detailed schematic representation of the active grille assembly of FIGS. 2a to 2c, in the closed position.
Figure 3A:
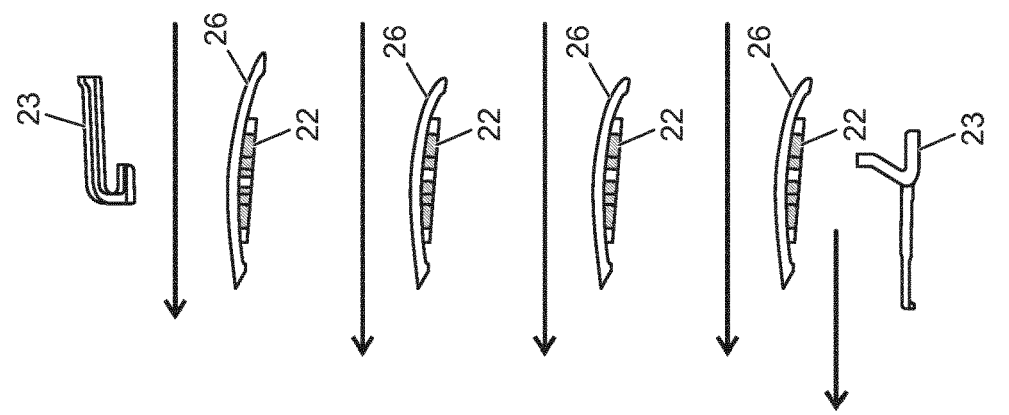
FIG. 3a shows a detailed schematic representation of the active grille assembly of FIGS. 2a to 2c, in the open position.

FIGS. 3a to 3c show the grille assembly 20 vanes 22 and surround 23 in greater detail. FIGS. 3a, 3b and 3c show the grille assembly in the open, closed and intermediate positions, respectively.

Figure 4:
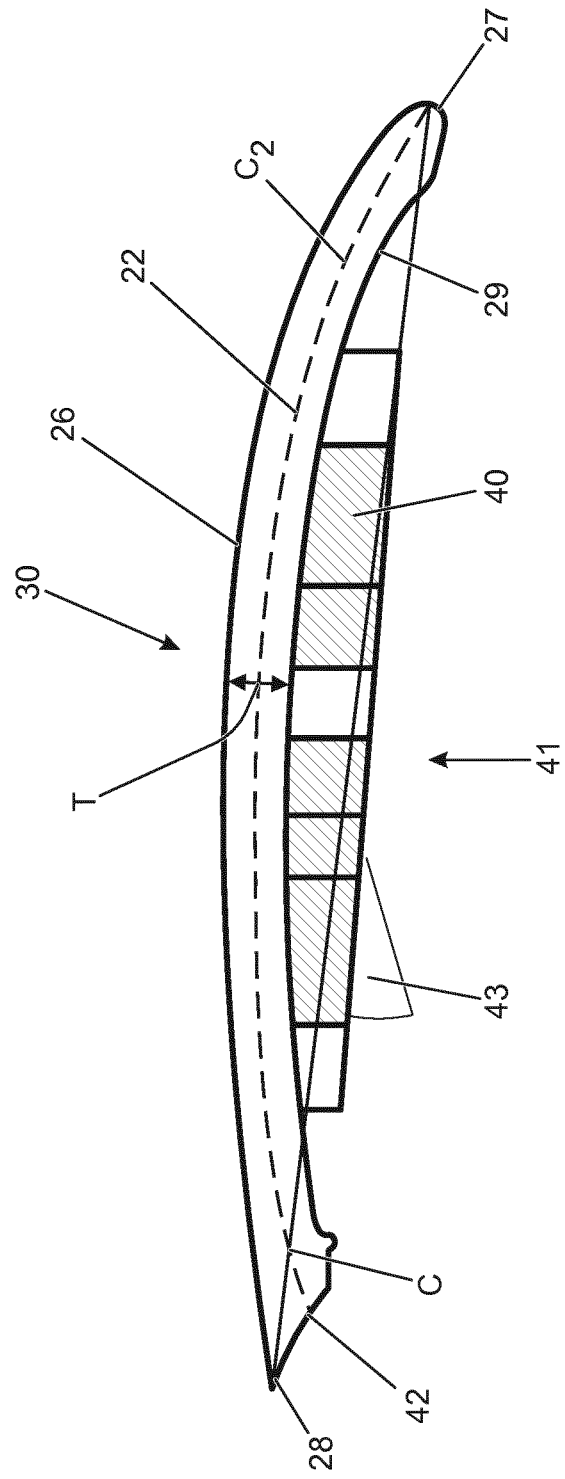
FIG. 4 shows a vane of the active grille assembly of FIGS. 2a to 3c.

FIG. 4 shows a vane 22, according to embodiments of the invention, end on to its axis of rotation. The vane 22 comprises a leading edge 27, trailing edge 28 and a primary surface 26 that extends in between the leading and trailing edges 27, 28. In use, the vane 22 is configured such that airflow passes around the primary surface 26 from the leading edge 27 to the trailing edge 28, when the grille assembly is in an open configuration. By 'open configuration', it is meant the open position of FIG. 3a or the intermediate position of FIG. 3c.

The leading edge 27, primary surface 26 and trailing edge 28 provide a continuous cambered attachment surface 30 which encourages attachment of the airflow to the respective vane 22 and discourages separation.

The term 'separation' refers to the flow phenomena in which a fluid flow becomes detached from the surface of an object. Separation is caused by slowing of the airflow immediately adjacent the object's surface. Sharp changes in direction of the airflow that result from sudden transitions in the surface profile cause the airflow to lose momentum and slow. Conservation of energy results in an unfavourable pressure gradient which builds in direct correspondence with the momentum loss and will, eventually, lead to separation.

The continuous cambered attachment surface 30 smooths out transitions in the surface profile of the vanes 22 which helps to maintain a favourable pressure gradient. This effect is particularly significant for intermediate positions of the vanes 22, such as the position of the vanes 22 depicted in FIGS. 2c and 3c. By encouraging airflow to remain attached to the cambered surface 30, the momentum of the airflow is increased which increases the total mass flow over the respective vane 22 by a corresponding amount. This improvement over conventional flat vanes allows the vanes 22 of the present invention to adopt intermediate positions like those shown in FIGS. 2c and 3c, while allowing satisfactory mass flow into the cooling pack 25. This in turn means that satisfactory cooling can be achieved while more of the airflow is directed over the exterior bodywork 210 of the vehicle, resulting in reduced aerodynamic drag.

By 'cambered surface', it is meant that the profile of the vane 22 is cambered, that is to say, in the manner of a conventional aerofoil. Camber is a measurable parameter and is herein defined with reference to the vane 22 illustrated in FIG. 4. The maximum camber is defined as the maximum distance between a centreline '$C_L$' and the chordline 'C', expressed as a percentage of the length of the chord line 'C'. The vanes 22 of the present invention comprise between 5% and 8% maximum camber. In one embodiment, the vanes 22 comprise 6.5% maximum camber. Such a camber helps to avoid a stall in the flow that would likely cause separation resulting in less airflow.

In embodiments of the invention, the maximum camber of each vane 22 is between 35% and 45% of the length of the chord line 'C', measured from the leading edge 27. In one embodiment, the maximum camber of each vane 22 is 40%, or 39.9%, of the length of the chord line 'C'. Such a maximum camber helps to improve efficiency by avoiding a blunt more obstructive profile.

The geometry of the vanes 22 can also be defined in terms of a chord to maximum thickness ratio. In the present embodiments, the chord to maximum thickness ratio is the ratio of maximum thickness as a ratio of the chord length, expressed as a percentage. The thickness is the thickest point 'T' of each vane 22 measured between the primary surface 26 and a lower, secondary surface 29 of the vane 22, perpendicular to the chord line 'C'. The profile of the vanes 22 of the present invention has a chord to maximum thickness ratio of between 5% and 15%, or between 5% and 10%. In one embodiment, the vanes 22 have a chord to maximum thickness ratio of 8%. Such a chord to maximum thickness ratio helps to define an aerofoil profile for the vane which offers good flow attachment characteristics at the operating angles of attack of the vane and the airspeeds likely to be seen in operation of the active grille shutter assembly.

In embodiments of the invention, the maximum thickness of each vane 22 is between 15% and 25% of the length of the chord line 'C', measured from the leading edge 27. In one embodiment, the maximum thickness of each vane 22 is 20%, or 19.9%, of the length of the chord line 'C'. Such a maximum thickness helps to define a profile of the vane that is optimised to reduce the obstruction the vane makes when in an open position in the shutter grille assembly, allowing an optimum mass flow of air into a vehicle cooling pack.

In the illustrated embodiments, primary surface 26 refers to a convex surface of the vane 22 that faces the radiator 24 when the vanes 22 are arranged in the closed position. To move into the intermediate position, the vanes 22 rotate around their axis of rotation so that the chord line 'C' of each vane is angled between 0° and 90° relative to the position of the chord line 'C' of each vane in the closed. That is to say, the acute angle between the chord 'C' of each vane 22 in its closed position and the chord 'C' of each vane 22 in its intermediate position is between 0° and 90°. For example, when the axes of the vanes 22 are disposed horizontally, the chord line 'C' of each vane 22 will be disposed between 0° and 90° relative to the vertical.

The fully open position is defined as the position of the vanes 22 which present minimal blockage of the intake 211. For most iterations of the vane shape, this will be when the chord lines 'C' of the vanes 22 are positioned between 80° and 90° to their position in the closed position.

In the closed position, the vanes 22 are positioned to seal the intake 211 and prevent airflow from passing into the cooling pack 25. In another embodiment, the trailing edge 28 of each vane 22 is configured to cooperate with the adjacent vane 22 when the vanes 22 are arranged in the closed position. In particular, the trailing edge 28 is configured to contact the cambered surface 30 of the adjacent vane to completely block the intake 211. In the illustrated embodiments, as shown most clearly in FIG. 4, a concave surface 42 depends from the trailing edge 28 and is configured to conform to the cambered surface 30 of the adjacent vane 22. Therefore, when the vanes 22 are arranged in the closed position, the concave surface abuts the cambered surface 30 of the adjacent vane 22, as illustrated in FIG. 3b.

During operation of the vehicle, the vanes 22 may adopt the intermediate position to reduce the total mass flow of airflow in the cooling pack 25. Airflow is drawn down and around the primary surface 26 and into the cooling pack 25. Relative to a vane comprising a flat low pressure surface—such as the shutters 12 of FIGS. 1a and 1b—the cambered surface 30 helps to discourage separation of airflow from the vanes 22 in the intermediate position. This increases the overall mass flow of airflow that passes over each vane 22, and into the cooling pack 25.

Vanes comprising flat low pressure surfaces tend to induce separation of the airflow at relatively shallow angles of attack. That is to say, at shallow angles relative to their fully open position. This separation phenomenon prevents present shutter assemblies, like that shown in FIGS. 1a and 1b, operating efficiently when the vanes are positioned in an intermediate position. In present embodiments, the cambered attachment surface 30 increases the efficiency of operation of the vanes 22, particularly in intermediate positions, as, by discouraging separation of the airflow, a greater mass flow is directed into the cooling pack 25.

As a further measure to discourage airflow separation from the vanes 22 when they are in the intermediate position, the leading edge 27 of each vane 22 is filleted to smooth the transition between the high pressure surface 29 and the primary surface 26. The filleted leading 27 edged turns the airflow more gradually than a square edge or a chamfered edge and encourages the airflow to track around the primary surface 26.

As shown in FIG. 4, the vanes 22 comprise a vortex generating feature 41 configured to generate a vortex in the airflow. When the vanes are in the intermediate position, the vortex is directed toward the cambered attachment surface 30 of an adjacent vane 22 which increases the turbulence of in the airflow in this region and further helps to discourage separation. In one embodiment, the vortex generating feature 41 comprises structural webbing having at least one stiffening rib 40 on the secondary surface 29. In another embodiment, the webbing additionally or alternatively comprises a vortex generating fin 43.

The intermediate position can be any position between the open and fully closed position. However, in one embodiment, the intermediate position is between 5° and 15° from the closed position. That is to say, the acute angle between the chord 'C' of each vane 22 in its closed position and the chord 'C' of each vane 22 in its intermediate position is between 5° and 50°. In one embodiment, the acute angle between the chord 'C' of each vane 22 in its closed position and the chord 'C' of each vane 22 in its intermediate position is between 14° and 31°. In another embodiment, the acute angle between the chord 'C' of each vane 22 in its closed position and the chord 'C' of each vane 22 in its intermediate position is 15°.

It has been found that when the vanes 22 of the present invention are positioned between 5° and 30° from the closed position, an advantageous balance is struck between directing airflow over the exterior bodywork 27 and directing airflow through the cooling pack 25. In particular, measurably more airflow is directed over the exterior bodywork 27 than if the vanes 22 were in the fully open position, yet the cooling pack 25 requirements are nonetheless met for a range of vehicle operating conditions. If the cooling pack 25 requirements increase, the vanes 22 can then move from the intermediate position into any number of further intermediate positions up to the fully open position.

Figure 5:
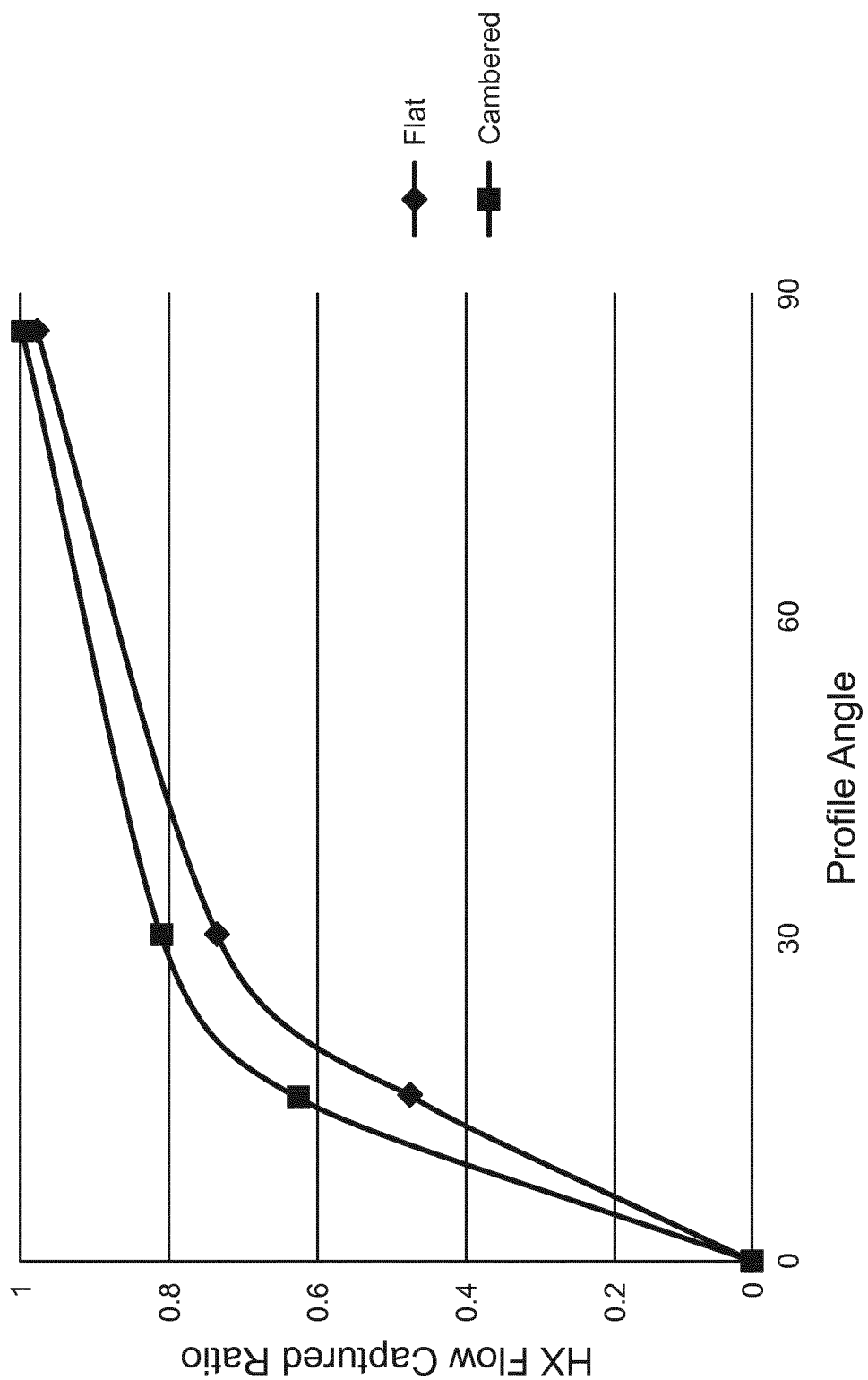
FIG. 5 shows a chart comparing the flow capture ratio of an active grille assembly in accordance with an embodiment of the invention with an example active grille assembly.

FIG. 5 illustrates the results of simulated testing of both flat vanes and vanes with a cambered attachment surface. The simulation was carried out with a four vane assembly like that shown in FIGS. 3a to 3c. The flow capture ratio was measured for each vane type at intermediate positions 15° and 30°, measured from the closed position. The flow capture ratio describes the mass flow through the intake 211 for each intermediate position of the vanes as a proportion of the mass flow through the intake 211 when the vanes are in their fully open position. It can be seen that for intermediate angles of around 15°, the proportion of mass flow though the intake 211 is significantly increased for cambered vanes relative to flat vanes.

The cooling pack 25 requirements will depend upon any number of factors, including, but not limited to: the engine coolant radiator outlet temperature, engine oil temperature, gearbox oil temperature and the vehicle occupant's requested cabin temperature. If, for example, the engine coolant temperature exceeds a threshold representative of an acceptable working range, the vanes are configured to move into a relatively more open position to allow a greater mass flow of air into the cooling pack.

Figure 6:
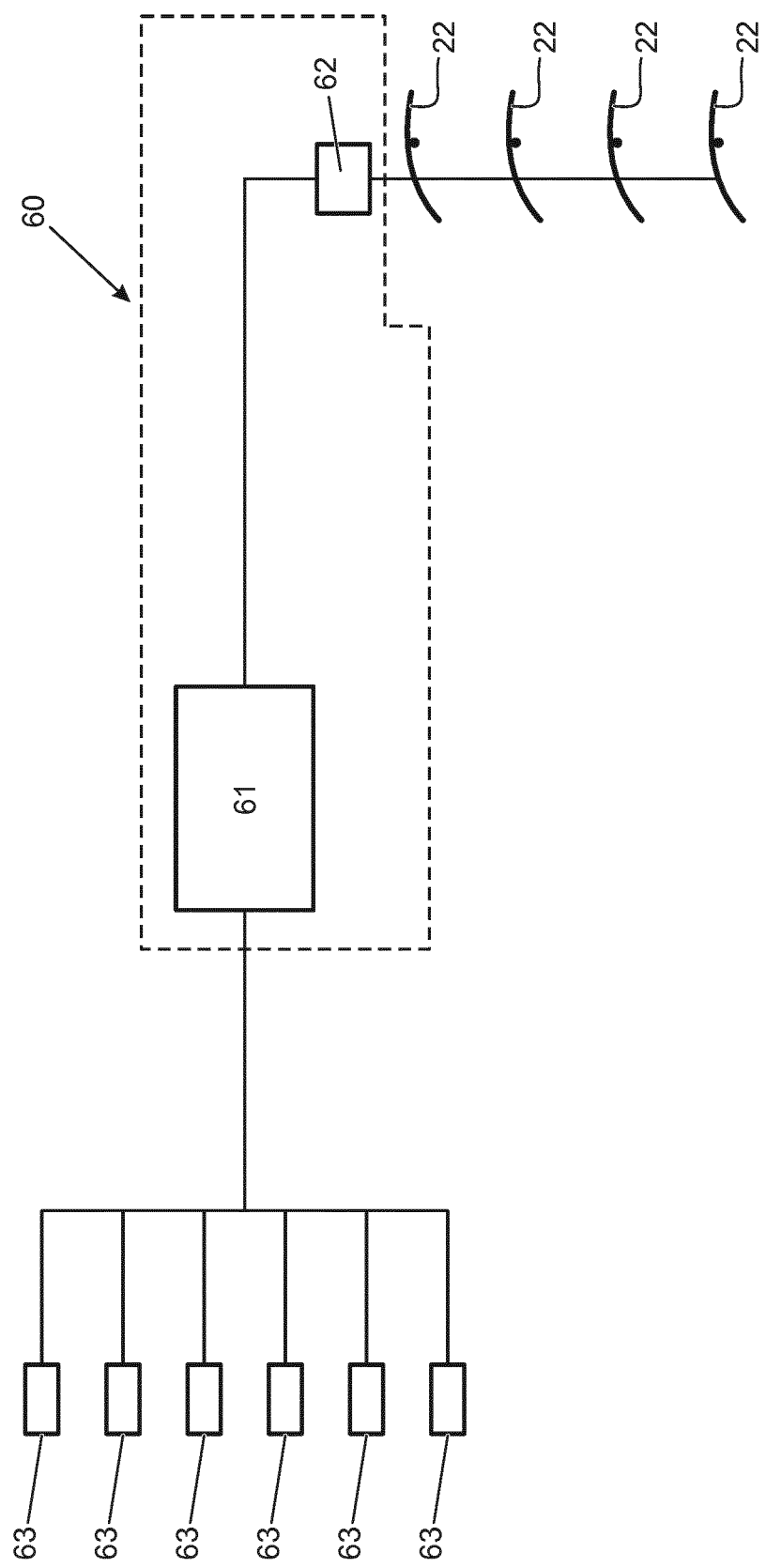
FIG. 6 is a block diagram illustrating a controller in accordance with an embodiment of the invention.

With reference to FIG. 6, the active grille assembly 20 further comprises a controller 60 configured to position the vanes 22 in any one of the closed position, open position or an intermediate position in dependence on the cooling pack 25 requirements.

To achieve this, the controller 60 comprises a cooling pack control unit 61 and an actuator 62. The cooling pack control unit 61 processes data gathered from one of a number of channels 63, each channel providing data on a respective vehicle parameter. The control unit 61 determines the cooling pack 25 requirement in dependence on the received data and generates a signal corresponding to a vane 22 position. The signal is transmitted to the actuator 62 which adjusts the position of the vanes 22 accordingly.

The channels 63 may provide data on any of: the engine coolant radiator outlet temperature, the engine oil temperature, the gearbox oil temperature, the fuel temperature, the vehicle occupant's requested cabin temperature, the ambient cabin temperature, the environmental temperature and the vehicle speed.

Figure 7:
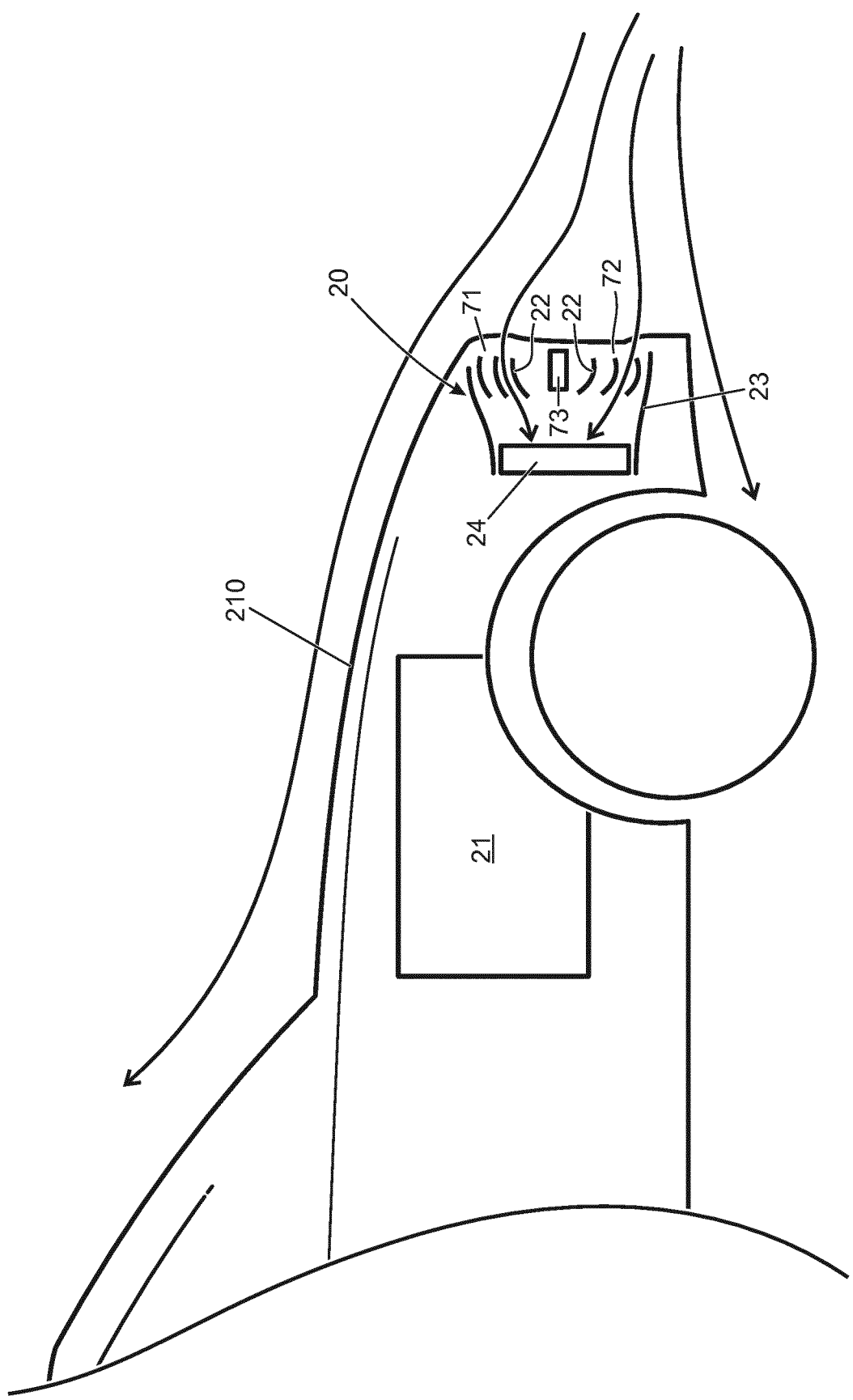
FIG. 7 shows a schematic representation of a vehicle comprising an active grille assembly, according to an embodiment of the invention.

It shall be appreciated that, although the vanes 22 are illustrated directing airflow from the top of the page toward the bottom of the page in their intermediate position, the direction of the vanes 22 could be reversed so that airflow is directed from the bottom of the page toward the top of the page; in other words, from the road level upwards. This allows the active grille assembly 20 to be positioned behind either upper or lower grilles of a vehicle's front bumper bar and ensure airflow is directed centrally at the radiator 24 when the vanes 22 are in the intermediate position. This further improves the efficiency of the intermediate position. This is illustrated in FIG. 7. In this embodiment the active grille shutter assembly 20 further comprises a first active grille shutter assembly 71 and a second active grille shutter assembly 72 separated by a bumper bar 73. The first active grille assembly 71 is positioned above the bumper bar, relatively further from the road surface; and the second active grille assembly 72 is positioned below the bumper bar, relatively closer to the road surface. Each vane 22 of the active grille assemblies 72, 73 is moveable between open, closed and intermediate positions as described above. However, in this embodiment the second active grille assembly is configured to direct airflow in an upward direction, away from the road surface. To achieve this, each vane 22 of the lower active grille assembly is reversed relative to each vane of the upper active grille assembly such that each vane is flipped 180° about an axis perpendicular to its respective axis of rotation. In other words, the primary surface 26 of each vane in the lower active griller assembly is a lower surface of the respective vane, or the surface closer to the road surface. Therefore, each vane 22 of both the first and second active grille assemblies is rotated anti clockwise to move between the closed and open positions.

Figure 8:
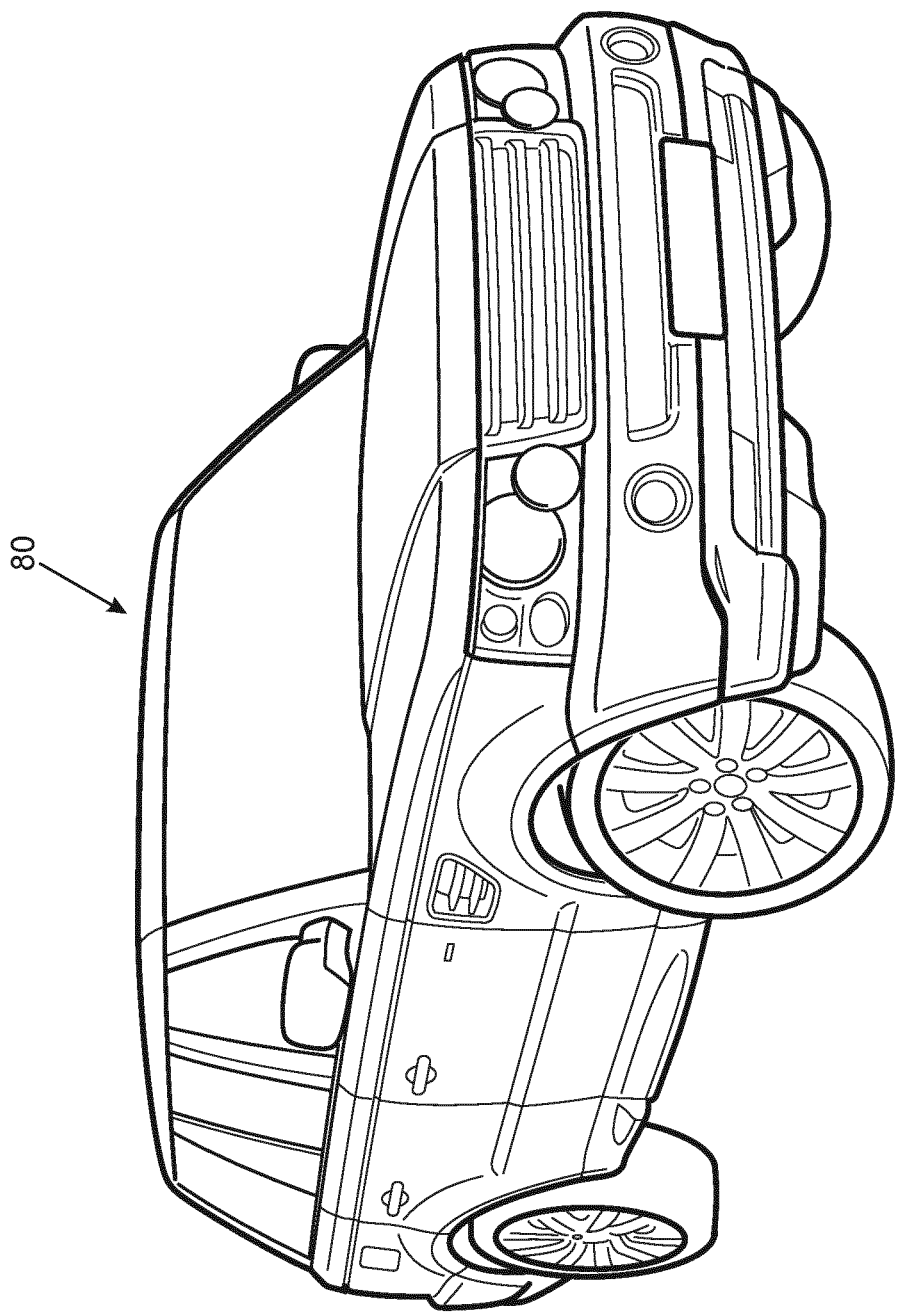
FIG. 8 shows a vehicle in accordance with an embodiment of the invention.

A vehicle 80 is shown in FIG. 8 comprising the active grille assembly of any of the embodiments described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

It will be appreciated that various changes and modifications can be made to the present invention without departing from the scope of the present application.

The following numbered clauses define various further aspects and features of the present technique:

1. An active grille shutter vane for an active grille shutter assembly, the vane comprising:
   a leading edge and a trailing edge whereby, in use, the vane is configured such that airflow passes around the vane from the leading edge to the trailing edge when the active grille shutter assembly is in an open configuration; and
   a primary surface extending between the leading edge and the trailing edge;
   wherein the leading edge, primary surface and trailing edge provide a continuous cambered attachment surface for the airflow passing over the primary surface to encourage attachment of the airflow to the vane.

2. An active grille shutter vane according to clause 1, wherein the vane comprises a chord to maximum thickness ratio of between 5% and 15%, or between 5% and 10%.

3. An active grille shutter vane according to clause 2, wherein the vane comprises a chord to maximum thickness ratio of approximately 8%.

4. An active grille shutter vane according to clause 2, wherein the vane comprises a chord to maximum thickness ratio of 7.8%.

5. An active grille shutter vane according to any preceding clause, wherein the vane comprises a maximum thickness at between 15% and 25% of the chord from the leading edge.

6. An active grille shutter vane according to clause 5, wherein the vane comprises a maximum thickness at approximately 20% of the chord from the leading edge.

7. An active grille shutter vane according to clause 6, wherein the vane comprises a maximum thickness at 19.9% of the chord from the leading edge.

8. An active grille shutter vane according to any preceding clause, wherein a centre line of the vane has a maximum camber of between 5% and 8%.

9. An active grille shutter vane according to clause 8, wherein a centre line of the vane has a maximum camber of 6.5%.

10. An active grille shutter vane according to any preceding clause, wherein a centre line of the vane has a maximum camber at between 35% and 45% of the chord from the leading edge.

11. An active grille shutter vane according to clause 10, wherein the centre line of the vane has a maximum camber at approximately 40% of the chord from the leading edge.

12. An active grille shutter vane according to clause 11, wherein the centre line of the vane has a maximum camber at 39.9% of the chord from the leading edge.

13. An active grille shutter vane according to any preceding clause, wherein the vane comprises a filleted leading edge.

14. An active grille shutter vane according to any preceding clause, wherein the vane comprises a secondary surface extending between the leading edge and the trailing edge, the secondary surface opposing the primary surface and comprising at least one vortex generating feature configured to generate a vortex in the airflow over the secondary surface.

15. An active grille shutter vane according to clause 14, wherein the at least one vortex generating feature comprises at least one fin.

16. An active grille shutter vane according to clause 14, wherein the at least one vortex generating feature comprises a structural web including a rib.

17. An active grille shutter vane according to any preceding clause, wherein the trailing edge of vane is configured to cooperate with the leading edge of an adjacent vane when said vanes are in a closed configuration.

18. An active grille shutter vane according to clause 17, wherein the trailing edge is configured to contact the cambered surface of the adjacent vane in the closed configuration.

19. An active grille shutter assembly for controlling airflow into an air intake, the active grille shutter assembly comprising at least one active grille shutter vane according to any preceding clause.

20. An active grille shutter assembly according to clause 19, wherein the at least one active grille shutter vane is moveable between a closed configuration in which the at least one vane is configured to inhibit airflow into the air intake, and an open configuration in which the at least one vane is configured to permit airflow into the air intake.

21. An active grille shutter assembly according to clause 20, wherein the open configuration comprises an open position, in which the at least one vane is configured to permit a first airflow into the air intake; and an intermediate position, in which the at least one vane is configured to permit a second, reduced, airflow into the air intake;

the active grille shutter assembly further comprising a controller configured to position the at least one active grille shutter vane in the intermediate position.

22. A vehicle comprising at least one active grille shutter assembly of any one of clauses 19 to 21.

23. A vehicle according to clause 22 comprising a first active grille shutter assembly and at least one further active grille shutter assembly, wherein:
the primary surface of the at least one active grille shutter vane of the first active grille shutter assembly comprises an upper surface of the at least one active grille shutter vane when in the open configuration; and
the primary surface of the at least one active grille shutter vane of the at least one further active grille shutter assembly comprises a lower surface of the at least one active grille shutter vane when in the open configuration.

24. A vehicle according to clause 23, wherein the first active grille shutter assembly is located above the at least one further active grille shutter assembly.

The invention claimed is:

1. An active grille shutter vane for an active grille shutter assembly, the vane comprising:
a leading edge and a trailing edge whereby, in use, the vane is configured such that airflow passes around the vane from the leading edge to the trailing edge when the active grille shutter assembly is in an open configuration; and
a primary surface extending between the leading edge and the trailing edge;
wherein the leading edge, primary surface and trailing edge provide a continuous cambered attachment surface for the airflow passing over the primary surface to encourage attachment of the airflow to the vane; and
a chord to maximum thickness ratio of between 5% and 15%, wherein the vane comprises a secondary surface extending between the leading edge and the trailing edge, the secondary surface opposing the primary surface and comprising at least one vortex generating feature configured to generate a vortex in the airflow over the secondary surface, wherein the at least one vortex generating feature comprises at least one fin.

2. An active grille shutter vane according to claim 1, wherein the vane comprises a maximum thickness at between 15% and 25% of the chord from the leading edge.

3. An active grille shutter vane according to claim 1, wherein a centre line of the vane has a maximum camber of between 5% and 8%.

4. An active grille shutter vane according to claim 1, wherein a centre line of the vane has a maximum camber at between 35% and 45% of the chord from the leading edge.

5. An active grille shutter vane according to claim 1, wherein the vane comprises a filleted leading edge.

6. An active grille shutter vane according to claim 1, wherein the trailing edge of vane is configured to cooperate with the leading edge of an adjacent vane when said vanes are in a closed configuration.

7. An active grille shutter assembly for controlling airflow into an air intake, the active grille shutter assembly comprising at least one active grille shutter vane according to claim 1.

8. An active grille shutter assembly according to claim 7, wherein the open configuration comprises an open position, in which the at least one vane is configured to permit a first airflow into the air intake; and an intermediate position, in which the at least one vane is configured to permit a second, reduced, airflow into the air intake;
the active grille shutter assembly further comprising a controller configured to position the at least one active grille shutter vane in the intermediate position.

9. A vehicle comprising at least one active grille shutter assembly of claim 7.

10. A vehicle comprising a first active grille shutter assembly and at least one further active grille shutter assembly, each of the first and second shutter assemblies comprising a plurality of vanes, each vane comprising:
a leading edge and a trailing edge whereby, in use, the vane is configured such that airflow passes around the vane from the leading edge to the trailing edge when the active grille shutter assembly having that vane is in an open configuration; and
a primary surface extending between the leading edge and the trailing edge;
wherein the leading edge, primary surface and trailing edge provide a continuous cambered attachment surface for the airflow passing over the primary surface;
wherein the trailing edge of the vane is configured to cooperate with the leading edge of an adjacent vane when said vanes are in a closed configuration, wherein the trailing edge comprises a concave shape configured to contact the cambered surface of the adjacent vane in the closed configuration; and wherein:
the primary surface of the at least one active grille shutter vane of the first active grille shutter assembly comprises an upper surface of the at least one active grille shutter vane when in the open configuration; and
the primary surface of the at least one active grille shutter vane of the at least one further active grille shutter assembly comprises a lower surface of the at least one active grille shutter vane when in the open configuration.

11. An active grille shutter vane according to claim 10, wherein the first active grille shutter assembly is located above the at least one further active grille shutter assembly.

12. An active grille shutter vane according to claim 1, wherein the at least one vortex generating feature comprises a structural web including a rib.

13. An active grille shutter vane according to claim 6, wherein the trailing edge is configured to contact the cambered surface of the adjacent vane in the closed configuration.

14. An active grille shutter vane according to claim 7, wherein the at least one active grille shutter vane is moveable between a closed configuration in which the at least one vane is configured to inhibit airflow into the air intake, and an open configuration in which the at least one vane is configured to permit airflow into the air intake.

15. An active grille shutter vane for an active grille shutter assembly, the vane comprising:
a leading edge and a trailing edge whereby, in use, the vane is configured such that airflow passes around the vane from the leading edge to the trailing edge when the active grille shutter assembly is in an open configuration; and
a primary surface extending between the leading edge and the trailing edge;
wherein the leading edge, primary surface and trailing edge provide a continuous cambered attachment surface for the airflow passing over the primary surface to encourage attachment of the airflow to the vane; and
a chord to maximum thickness ratio of between 5% and 15%, wherein the chord to maximum thickness ratio optimizes mass flow during low to intermediate engine load conditions.

* * * * *